June 27, 1967 H. S. DA MOTTA 3,328,802
SURVEILLANCE SYSTEM AND APPARATUS FOR RECORDING THE LISTENING OR VIEWING HABITS OF RADIANT ENERGY WAVE SIGNAL RECEIVER USERS
Filed April 9, 1965 5 Sheets-Sheet 1

INVENTOR
HELIO SILVEIRA DA MOTTA
BY
Wynne + Finken
ATTORNEYS

SURVEILLANCE SYSTEM AND APPARATUS FOR RECORDING THE LISTENING OR VIEWING HABITS OF RADIANT ENERGY WAVE SIGNAL RECEIVER USERS

Filed April 9, 1965

INVENTOR
HELIO SILVEIRA DA MOTTA

BY Wynne + Finken
ATTORNEYS

INVENTOR
HELIO SILVEIRA DA MOTTA

BY Wynne + Finken
ATTORNEYS

INVENTOR
HELIO SILVEIRA DA MOTTA

BY Wynne + Finken
ATTORNEYS

INVENTOR
HELIO SILVEIRA DA MOTTA
BY Wynne + Finken
ATTORNEYS 3,328,802

SURVEILLANCE SYSTEM AND APPARATUS FOR RECORDING THE LISTENING OR VIEWING HABITS OF RADIANT ENERGY WAVE SIGNAL RECEIVER USERS

Helio Silveira da Motta, Rua General Ozorio 386, Sto. Amaro, Sao Paulo, Brazil

Filed Apr. 9, 1965, Ser. No. 447,022
8 Claims. (Cl. 346—37)

ABSTRACT OF THE DISCLOSURE

A surveillance system for radiant energy communication receivers wherein the tuned or untuned condition of the receiver is sensed and utilized to electrically align a tape punching device just prior to constant periodic actuation of the tape punching device to punch coded holes in the tape in accordance with the condition of the receiver.

This invention relates to a surveillance system and apparatus for recording radio listening or television viewing habits of users of radiant energy wave signal receivers.

The invention comprises a device which can be easily connected to a radio or television receiver by the connection of three wires at the receiver's on-off switch and power lines and the installation of a slave unit of multiple contact rotary switches on the shaft of the station switch. A cable extends from the collaborator's receiver to a suitable location inside or outside of the house to a recorder which produces a continuous record on punched tape of the tuned or disconnected condition of the receiver and, if tuned, the station setting thereof.

The device is started at an identifiable time and from that time on, time perforations may be made in the tape at, for example, one minute intervals. If the receiver is tuned to a preselected station, a single code perforation or a number of code perforations in accordance with a predetermined code are made transversely of the tape, thereby identifying the station to which the receiver is tuned. If the receiver is disconnected from preselected stations, a disconnect perforation is made in the tape. The resultant punched tape is then removed and run through converting equipment which, for example, transfers the recorded data from the tape to cards for use in statistical analysis with similar recorded data obtained from other collaborators.

The abovementioned conversion and statistical analysis can be accomplished in numerous conventional manners. It is the purpose of this invention to provide an economical surveillance system which will faithfully record the habits of the user of a receiver through a punched tape system using a recorder designed to operate in a trouble-free fashion over long periods of time.

More particularly, the system involves a kit which may be easily installed at a collaborator's home. Wires are connected, as by soldering, to one power source line at either side of the on-off switch of the receiver and a third wire is soldered to the other power source line. The slave unit of multiple contact rotary switches is mechanically coupled for rotation with the station switch of the receiver. Wires from the slave unit and the three wires from the power source lines extend as a cable to the recorder device which can be mounted at a distant location. The cable's multi-prong plug is received in the recorder's socket and a safety switch in the recorder may then be turned on at a predetermined time to start the recording operation. At set intervals of one minute, for example, perforations are made in the tape indicating the tuned condition to one of a preselected group of stations and the untuned disconnect condition of the receiver. If the receiver is off, or on but not tuned to one of the preselected group of stations, a single disconnect perforation is made in the tape. If the receiver is tuned to a station of the group, one or more perforations may be made in the tape in accordance with a preselected code. The tape is intermittently driven in a precise fashion and the perforations are made at transverse locations across the tape.

Preferably, the time perforations are also made at one minute intervals along the central portion of the tape to provide for a sound driving connection for the tape in the recorder and in the reading or converting equipment. The time perforations also provide a base or time reference line on the tape.

Once connected, power is always delivered to the recorder to drive an electric timer motor or timing means and activate a rectifier for firing code solenoids when the receiver is tuned and for firing a disconnect solenoid when the receiver is off or when the receiver is on but not tuned to a station from the preselected group. When the receiver is off, the slave unit in the receiver is bypassed by a switch means and the disconnect solenoid is periodically energized to produce a disconnect perforation in the tape. When the receiver is on but not tuned to a selected station, the switch means passes current through the slave unit and back through disconnect lines to the recorder for similar firing of the disconnect solenoid. When the receiver is on and tuned to a station of the preselected group, the switch means in the recorder passes current through the slave unit in the receiver and back through lines which activate one or more code solenoids to perforate the tape in accordance with a predetermined code.

It will be understood that only during the fraction of a minute that perforation is taking place are the solenoids energized, thereby reducing heat and extending the life thereof.

The actual power for intermittently driving and perforating the tape is developed by a power solenoid. The electric timer moter actuates a double micro-switch, one micro firing the code solenoids or disconnects solenoids just prior to the firing of the power solenoid by the other micro. The code solenoids and disconnect solenoids align bars for driving punch pins through the tape just prior to the driving thereof by a driving plate actuated by the power solenoid. During its perforating movement, the driving plate stores energy in a tape indexing spring and during return this stored energy is used to index the tape and accomplish take up of the tape on a take-up reel.

The recorder head is resiliently mounted on a base and through its particular structural arrangement and adjustable buffer means and the like, as will be explained, the critical operating elements are combined into a sound unit of great structural integrity enabling long running periods without interruptions for servicing or preventive repair.

In summary, therefore, it will be understood that this invention involves a system having a recorder with a timing means for periodically closing a set-up switch and then closing an actuating switch. Set-up means are provided which respond to the set-up switch and the condition of the receiver to set up the recorder to punch a predetermined code identifying the receiver condition. Actuating means respond to the actuating switch to punch the previously set up code in the tape and then advance the tape for the recording operation. As will be explained, switch means including a switch solenoid and switch are provided to bypass the slave unit when the receiver is off.

These and further objects and advantages of the present invention will become more apparent upon reference to the following specification, appended claims and drawings wherein:

Figure 1:
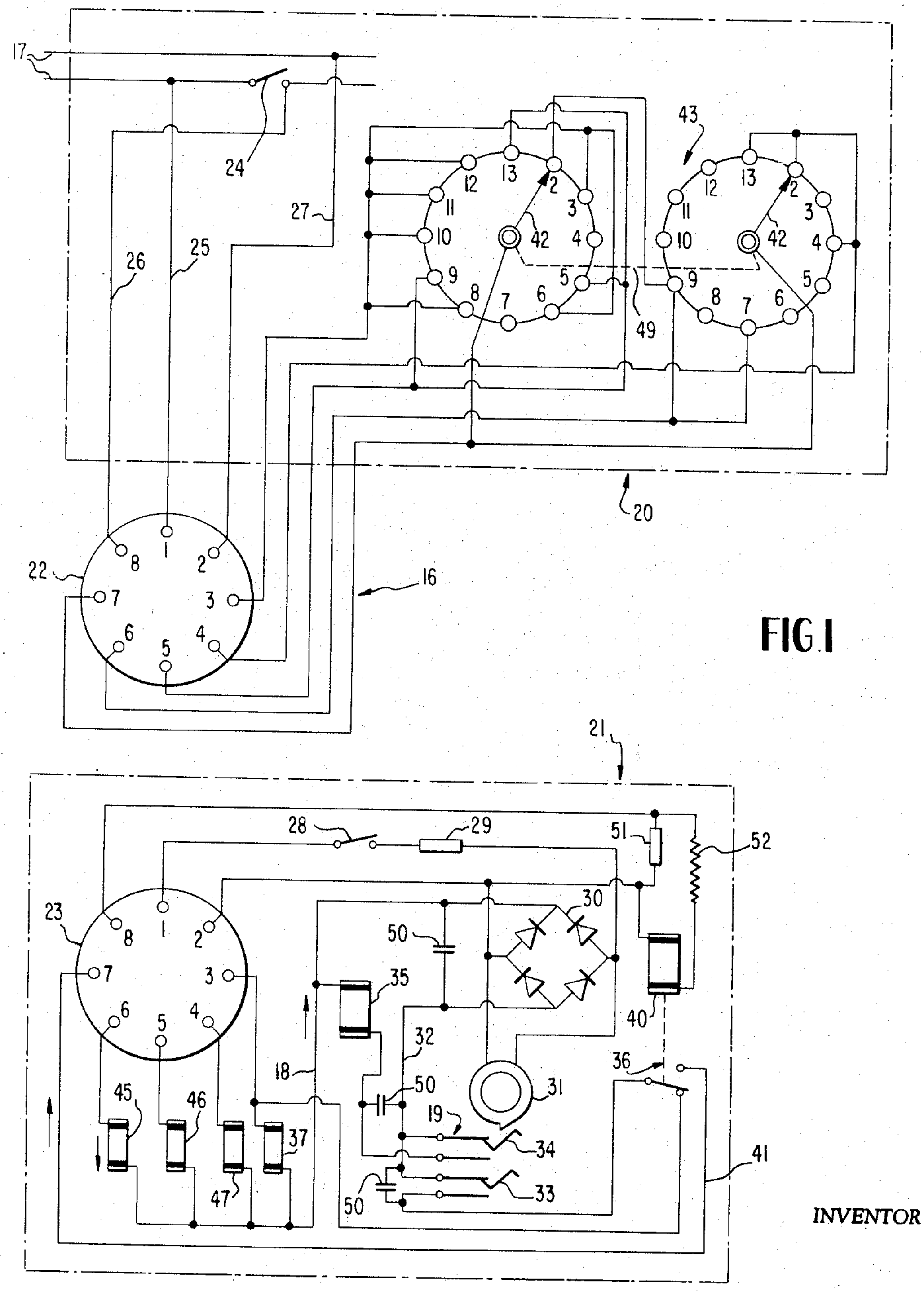
FIG. 1 is a circuit diagram of the system.

FIG. 1 diagrammatically shows a receiver 20 and a recorder 21, a cable 16 extending from the receiver and having a terminal multi-pronged plug 22 connectible with socket 23 of the recorder 21. The receiver on-off switch 24 is in one line of the power supply 17 and cable wires 25 and 26 are soldered on opposite sides thereof and terminate at plug pins 1 and 8 respectively with the third cable wire 27 soldered to the other line of the power supply 17 and terminating at plug pin 2. Wire 25 connects through a safety switch 28 and safety fuse 29 to one pole of a bridge silicon rectifier 30 and an electric timer motor or synchronous watch 31. Wire 27 is directly connected through plug pin 2 to the other pole of rectifier 30 and of timer motor 31, thereby providing a continuous supply of power to the recorder 21 regardless of the on or off condition of the receiver switch 24.

One direct current line 32 from the rectifier 30 is interrupted by a double set-up switch or micro-switch 19 which includes micro 33 and actuating switch or micro 34 which are actuated or tripped by the timer motor 31, micro 33 being tripped first to condition the recorder and then micro 34 being tripped to cause tape perforation. Micro 34 connects with power solenoid 35 and then to the other direct current pole of the rectifier 30. The power solenoid 35 is part of the mechanism which powers the punching and advancing of the tape. The other micro 33 connects with switch means 36 which is shown in the "off" position it assumes when the receiver 20 is off to connect the disconnect solenoid 37 through line 18 with the other pole of the rectifier 30. When the receiver is not tuned to one of a preselected group of stations or is off, that is, in disconnect position, the disconnect solenoid 37 is energized just prior to and then along with the power solenoid 35 on every minute interval rotation of the timer motor 31 to produce a disconnect perforation in the tape.

As will be further explained, the double micro-switch 19 is designed to close micro 33 prior to micro 34 and then hold both closed for a period, thereby enabling the alignment of control levers by micro 33, which must preset certain parts, before the power solenoid 35 through micro 34 causes the punching action.

When the receiver on-off switch 24 is closed, wires 26 and 27 through plug pins 8 and 2 place the alternating current switch solenoid 40 across the power lines 17 to the receiver 20 and cause the switch means 36 to be moved upwardly as seen in FIG. 1 from its "off" position and held against a spring return bias in a station responsive position which connects micro 33 through line 41 through plug pin 7 with the terminal rotating contacts 42, 42 positioned as shown at number 2 of the slave unit 43. The rotating contacts 42, 42 are connected together by a shaft indicated at 49. It will be noted that the left hand terminal 2 of the slave unit connects through plug pin 6 to code solenoid 45 and that the right hand terminal 2 connects through plug pin 4 to code solenoid 47, thereby providing a two hole code for terminal 2 of the slave unit. Similarly, if the rotating contacts 42, 42 are at slave unit terminal 5, code solenoid 46 will be energized to produce a one hole code for terminal 5. Many combinations can be produced by stacking more rotary switches together. In the embodiment shown the other slave unit terminals produce the following connection: terminal 4 connects code solenoid 47; terminal 7 connects code solenoid 45; terminal 9 connects code solenoids 45 and 46; and terminal 13 connects code solenoids 46 and 47. The remaining group of slave unit terminals 3, 6, 8, 10, 11 and 12 are all connected to the plug pin 3 which is in turn connected to the disconnect solenoid 37. It will be understod that this group of slave unit terminals represents the unused channels or stations of a television receiver and that even though the receiver is on, the only tape perforation required is one to show the disconnect condition since no viewing is taking place.

Suitable capacitors 50 are employed for improved current rectification and elimination of sparks at the double micro-switch. Also, the alternating current solenoid 40 is equipped with a diode 51 and resistance 52 as shown to aid in rectification and avoid reverberations.

Figures 2, 9:
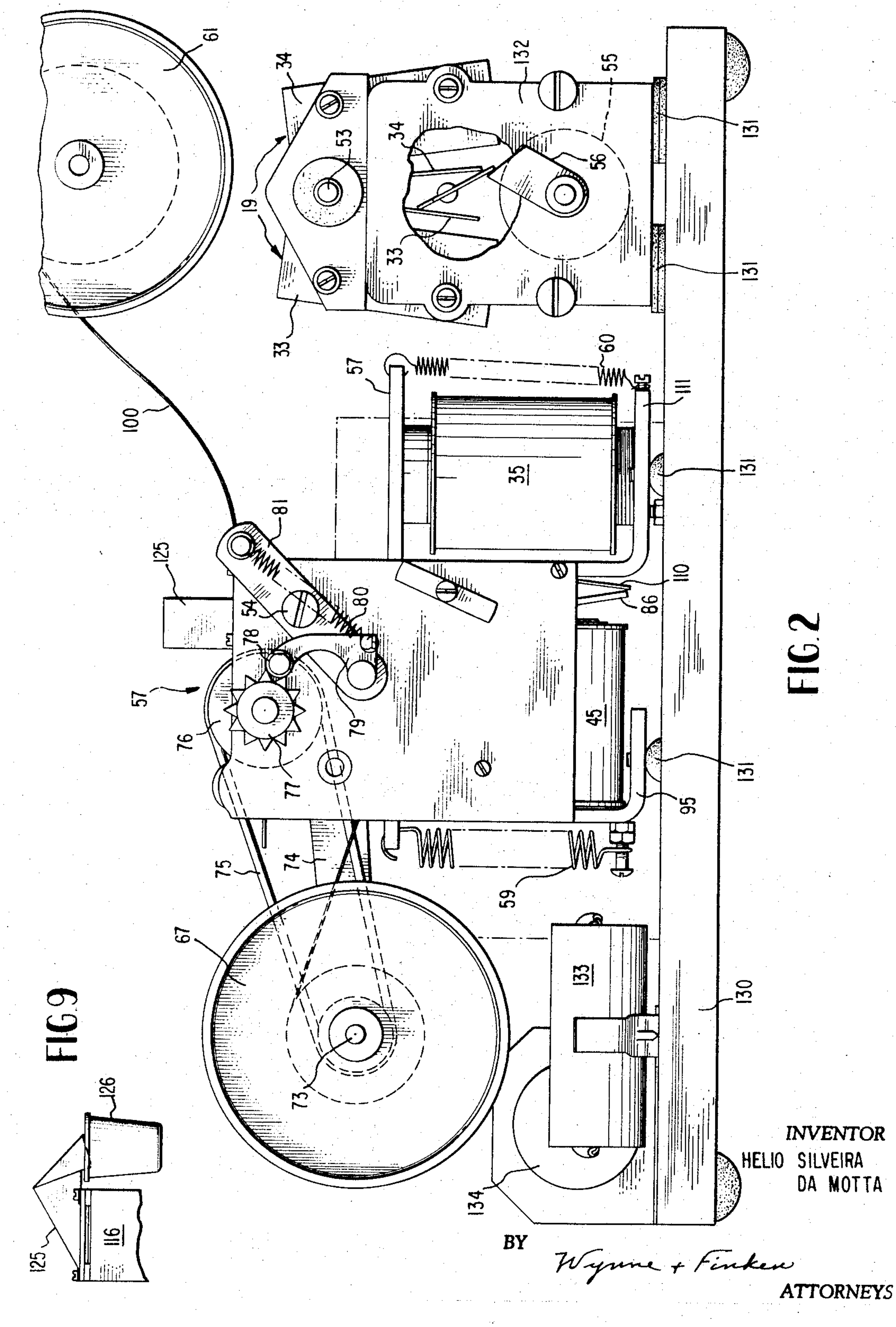
FIG. 2 is a side view of the recorder with the housing removed and the tape supply reel shown removed from and above its shaft, certain parts being cut away for clarity.
FIG. 9 is an end view of the deflector housing and hopper.

FIG. 2 is a side view of the recorder with portions broken away and tape supply reel 61 removed from its shaft 53 and elevated for clarity. The timer motor 55 has an arm 56 rotated thereby at one revolution per minute for engagement with the double micro-switch 19 to first close micro 33 to coordinate the recorder with the receiver station setting or disconnect condition and then close micron 34 to energize power solenoid 35 to pull the driving plate 57 pivoted on shaft 58 downwardly against the domed resilient buffer shown to cause tape perforation and intermittent tape drive.

The driving plate 57 is biased away from the power solenoid by power-storage spring 59, while spring 60 lends movement stability by exerting a light force in the opposite direction.

Figures 3, 4:
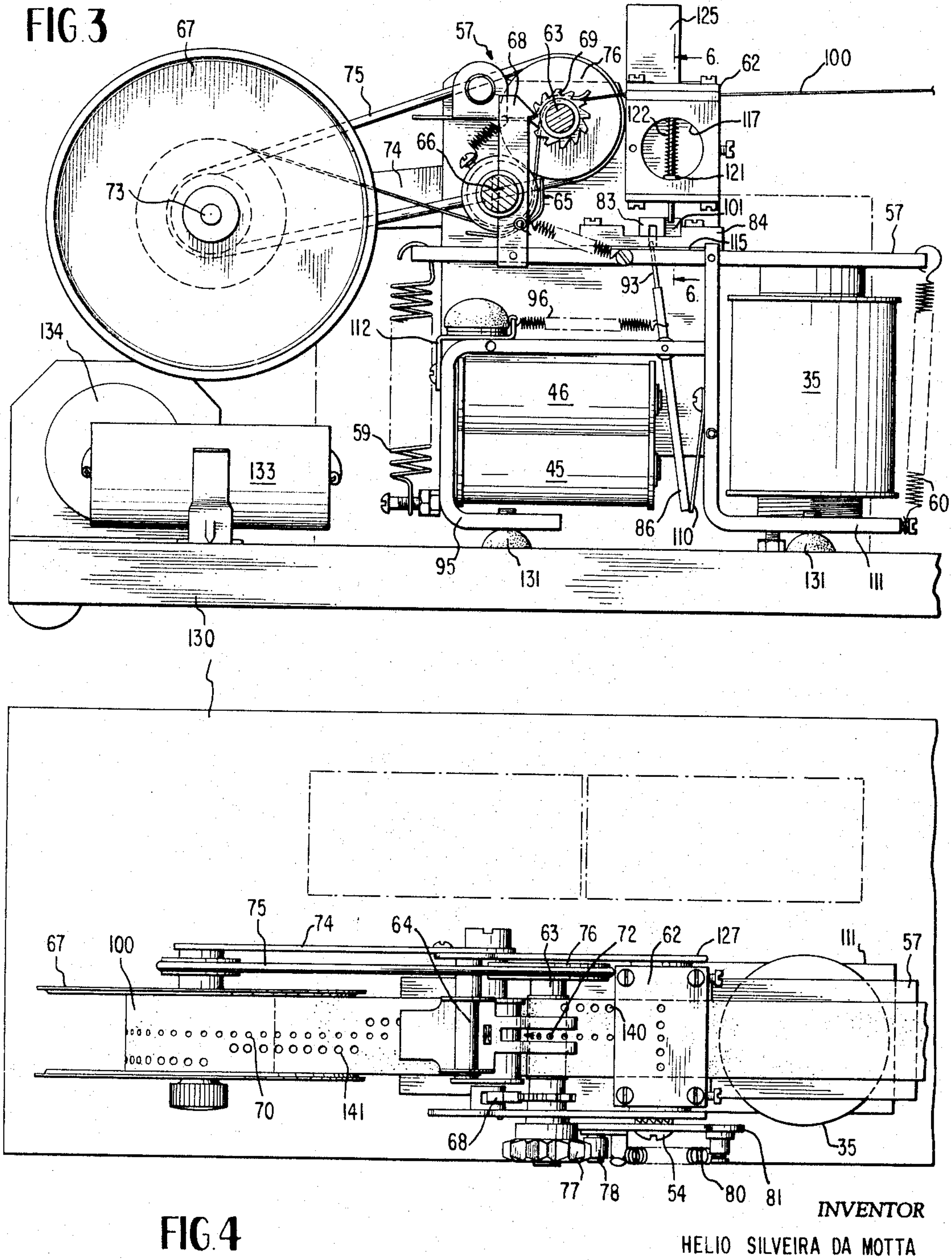
FIG. 3 is a side view similar to FIG. 2 of the recording head portion of the recorder, the side plate being removed to show the elements of the head.
FIG. 4 is a top view of FIG. 3 with the above-mentioned side plate in assembled condition.
Figures 5, 6:
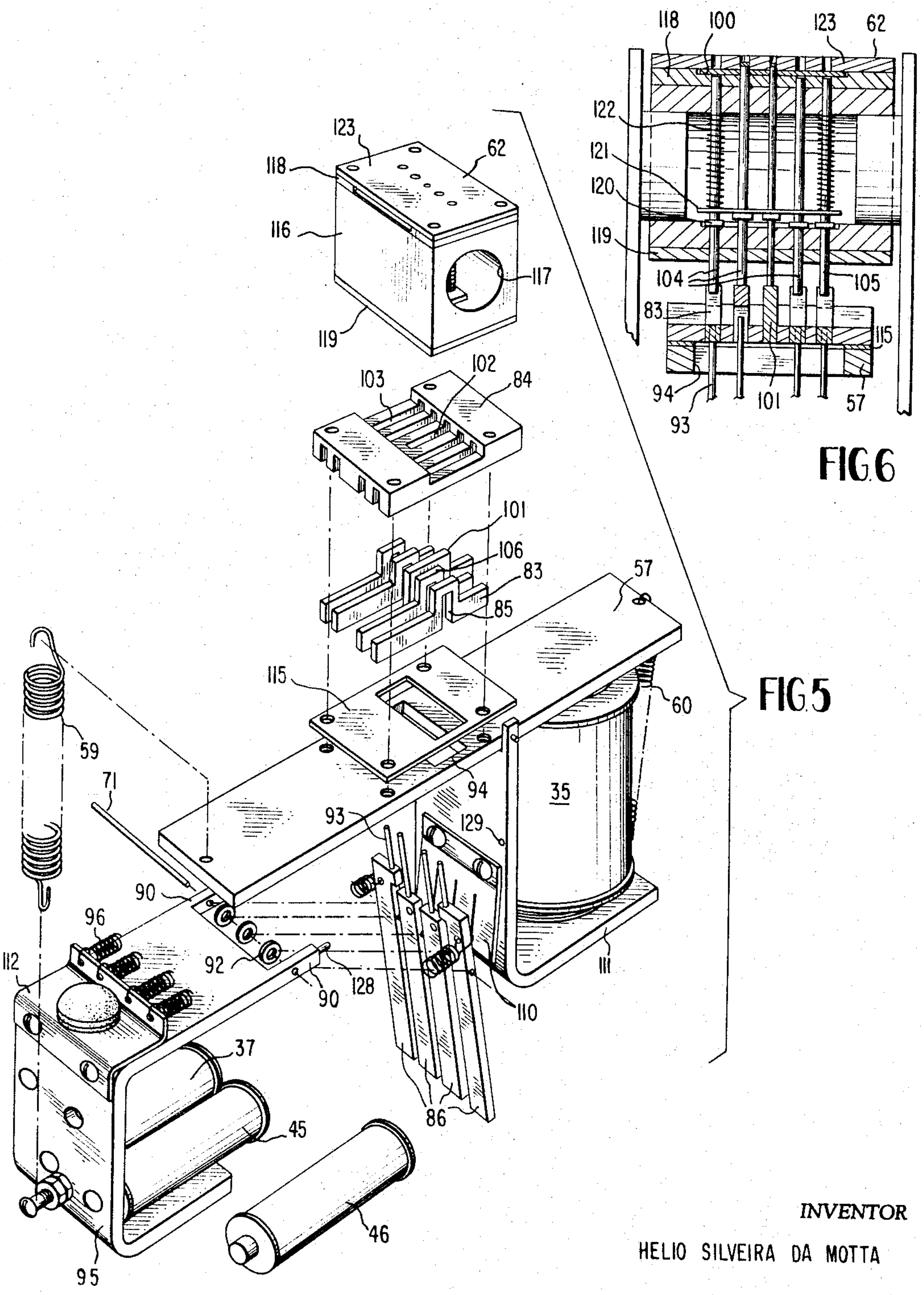
FIG. 5 is an exploded perspective view of the head.
FIG. 6 is a cross sectional view taken on line 6—6 of FIG. 3.

The paper tape 100 as seen in FIGS. 2–4 is stored on the supply reel 61 and passes through the perforation die 62, between the traction cylinder 63 and the pressure pawl 64, between the tape guiding plate 65 and the tape supporting roller 66, and then to the tape collecting reel 67.

When one end of the driving plate 57 is pulled downwardly to a horizontal position by power solenoid 35, the other end of driving plate 57 lifts the ratchet pawl 68 so that it catches the next tooth of ratchet 69. When the power solenoid 35 is de-energized, the mentioned other end of the driving plate is pulled down by spring 59 which causes the ratchet pawl to turn the ratchet 69 and its connected traction cylinder 63 thirty degrees to intermittently drive tape 100 through the recording head indicated by numeral 57. When threading new, tape, pressure pawl 64 nails the tape 71 on the traction cylinder central annular row of teeth 72. In operation the recording head 57 punches a time hole 70 to coincide with these teeth to facilitate the tape drive. The take-up reel 67 is pinned to a shaft 73 on an extension arm 74, the shaft 73 being rotatable by means of a slip connection with a transmission belt 75 which is in turn driven by the pulley 76 connected to the traction cylinder 63. The slip connection compensates for the tape build-up on the take-up reel 67.

Accurate positive control of the tape drive is provided by the spacing rosette 77 which is also fixed on the shaft of the traction cylinder 63. A roller 78 mounted at one end of an angular bell crank lever 79 is pressed into the recesses of the rosette 77 by spring 80 mounted at the other end of the lever 79. The bell crank lever 79 is pivoted at one side of a member 81 which is pivotally adjustable about its central portion at clamping screw 54 in the side plate to a fixed position to adjust the tension of the spring 80 which is connected at the other side of the member 81. Preferably the rosette 77 is designed to allow tape movement providing 10 perforations per inch of tape.

It will therefore be understood that when the power solenoid 35 is energized, the tape drive system is cocked by the driving plate 57 and when the power solenoid 35 is de-energized, the power stored in spring 59 is released to drive the tape.

Tape perforation takes place when the driving plate 57 is drawn to horizontal position by the power solenoid 35.

Tape perforation is accomplished by means of the bars 83, the middle bar 101 being fixed and the other bars 83 being movable forward or backward in slots 103 in the guiding-block 84 rigidly mounted on the driving plate 57. The movable bars are provided with bottom slots 85 (FIGS. 5–8) to receive their respective control lever 86. The fixed middle bar 101 is locked in the corresponding middle socket 102 of the guiding-block 84, in a permanently advanced perforating position. The bars 83 act as chocks between the driving plate 57 and the perforating code punch pins 104 and disconnected punch pin 105. Every time the driving plate 57 is pulled to the horizontal position, it causes the shoulders 106 of any bars in the advanced position to be pressed against their respective punch pins to perforate the tape 100 inside the perforating die 62. The fixed middle bar 101 is always in perforating position and, therefore, perforates the tape 100 every time the driving-plate is drawn to the horizontal position. When a bar 83 is in retracted position, its shoulder is downstream and not aligned with its respective punch pin when the driving plate moves to the horizontal position, not providing, therefore, the required chock between the driving-plate 57 and the punch pin to effect tape perforation.

The four control levers 86 are selectively pivoted to advanced positions by their respective code solenoids 45, 46 or 47 or the disconnect solenoid 37, it being noted that the disconnect solenoid 37 fires every minute during shut down of the television receiver or when the station switch, is at a terminal of the slave unit which is not being surveyed. Also, it will be remembered that a middle line of time perforations 70 is always made for tape traction by the middle fixed bar 101 which has no control lever.

The control levers 86 are pivoted between legs 90 of C-frame 95 on an axle 71 with spacers 92 positioned between levers. The upper end of each lever is in the form of a stem 93 which extends through enlarged slot 94 in driving plate 57 into its respective bottom slot 85 in its bar. It will be noted that the control levers 86 are independent of each other and that they are assembled on a common armature or C-frame 95 along with the code solenoids 45, 46 and 47 and the disconnect solenoid 37.

The control levers 86 are adjustably positioned with respect to their solenoids by means of adjustment of the resultant stress applied to them by their respective return springs 96 which bias the levers to a retracted position and the four adjustable leaf springs 110 which engage the bottoms of the control levers and thereby regulate the distances the levers are from their solenoids when in retracted position. Precise spacing is required since the selected bars must be quickly and faithfully moved into punch pin driving position prior to actuation of the driving plate. A large spacing might result in slow action with possible failure of the bar to contact its punch pin. The leaf springs 110 also provide a shock buffer for the control levers.

It will be noted that the leaf springs 110 are formed from a single sheet which has vertical slits formed therein to provide an individual leaf spring 110 for each control lever 86. It will be understood that each leaf spring 110 will require a slightly different adjustment to effectively space its control lever 86 from the solenoids mounted in two horizontal rows with the lower row of solenoids requiring a slightly greater extension of their leaf springs. The leaf spring means is mounted on the rearward side of the L-shaped frame or armature 111 which supports the power solenoid 35. The return springs 96 for the control levers 86 are mounted on a bracket 112 attached to the top rearward portion of the C-frame or armature 95, this connection enabling tension adjustment by means of spacers, if required.

It has been found that the bars 83 operate effectively over long periods of time and with less strain on the operating elements of the recording head 57 by the addition of a bearing insulator 115 interposed between the bottom surfaces of the bars 83 and the driving plate 57, this insulator 115 being in the form of a flat rectangular sheet of thin non-magnetizable metal such as a copper-phosphorous metal to provide a magnetic insulator as well as a smooth bearing surface. The driving plate 57 and the insulator 115 having matching rectangular holes therethrough for passage of the control lever stems 93.

Figure 7:
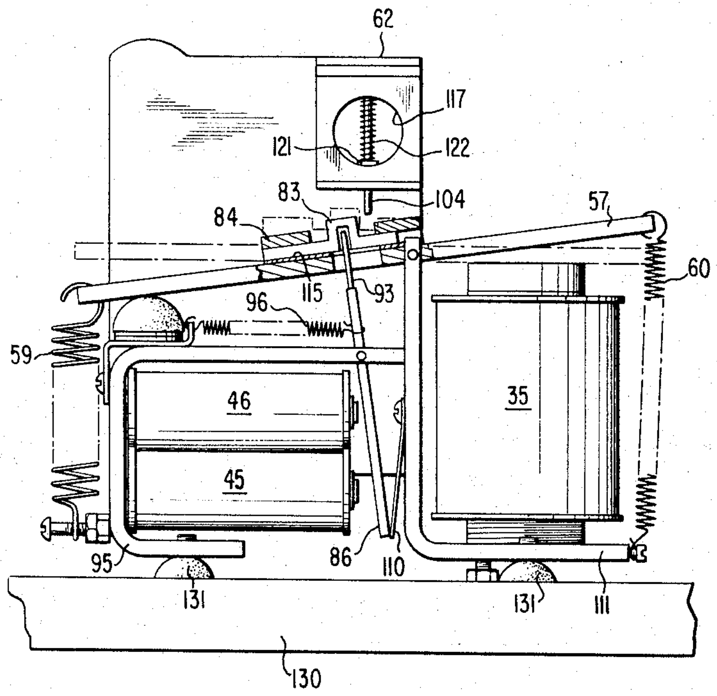
FIG. 7 is a side view somewhat similar to FIG. 2 showing the positions of the elements when the receiver is in disconnect condition, the dotted lines showing the position assumed when the power solenoid is energized.
Figure 8:
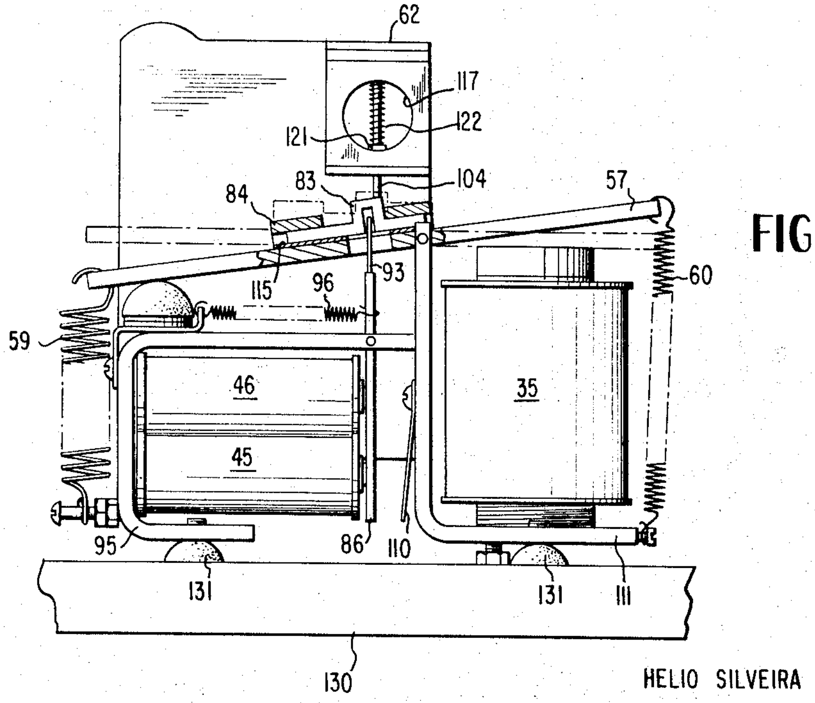
FIG. 8 is a view similar to FIG. 7 with the elements advanced to set up the recording head in response to a tuned condition of the receiver.

As seen in FIGS. 7 and 8, the solid lines indicate the retracted position of the driving plate 57. The dotted lines indicate the position assumed by the parts when the driving plate 57 is drawn by its power solenoid 35 to a horizontal perforating position. It will be noted that the shoulder of the bar 83 passes upwardly and downstream of the lower end of its punch pin 104 in FIG. 7. FIG. 8 shows control lever 86 moved by its solenoid into advanced position, thereby causing movement of its bar 83 to the advanced position shown. Upon perforating movement of the driving plate 57, the shoulder is pivoted about the driving plate shaft to upward driving engagement with its punch pin 104 as shown in dotted lines.

The tape punching head 62 is preferably formed from square or rectangular stock 116 through which a hole 117 is drilled and to the upper and lower surfaces of which are mounted plates 118 and 119 having bearing holes for the punch pins 104 and 105. Each punch pin has an annular ring 120 at its lower portion for supporting a top bar 121 which in turn provides the base for the return springs 122 positioned between the bar and the top of the head. The lower part of the annular ring seats on the lower portion of the head. A punching die plate 123 is mounted at the top and the punched out disks of tape build up in this top die plate and are ultimately forcibly projected outwardly therefrom into contact with deflector housing 125 for final deflected passage into the collection hopper 126 mounted at the side of the recording head.

Preferably the take-up reel 67 is mounted on an arm 74 extending downstream and connected to the recording head 57 with the belt drive pulley 76 therefor being affixed to the traction cylinder 63 inwardly of the side plate 127 of the recording head. Also, the upper upstream end of the C-frame 95 is provided with alignment pins 128 extending horizontally from the shaft supporting arms 90 and housed within alignment holes 129 in the vertical leg of the L-shaped frame 111, it being noted that the lower legs of the C-frame and L-frame are resiliently mounted to the base 130 through buffers 131, thereby providing a resiliently mounted recording head 57 wherein all critical operating parts are effectively aligned in a simple and precise fashion resulting in long life and a minimum of required maintenance. The timer motor 55 and its micro-switch 19 along with the supply reel 61 are similarly resiliently mounted on buffers as a unit on a pillar 132 attached to the frame 130 upstream of the recording head 57. Electrical components 133 such as the female plug 134, condensers, rectifiers, etc., are suitably mounted in remaining space on the base 130 so that all may be housed within a suitable outer housing.

In use, a tape 100 is threaded through the recording head 57 to the take-up reel 67 with the teeth 72 of the traction cylinder 63 providing the initial incremental intermittent movement of the tape. Suitable connections, as discussed, are made in the receiver 20 of the collaborator and the terminal plug 22 is attached to the socket 134 which extends through the housing. The safety switch 28 may then be turned on at a recorded time, thereby activating the recorder 21 and starting the surveillance of the collaborator's use of its receiver 20. Assuming the receiver is turned off, a central line of perforations 70 may be made every minute, this being the time track which facilitates the tape drive. At the same time, a disconnect perforation 140 will be made for later reading by converting equipment. If the receiver 20 is turned on, and a station not selected for surveillance is tuned, a disconnect perforation 140 will be made on the tape. If, however, the receiver is turned on and a station of the selected group to be surveyed is tuned, a coded perforation such as 141 will be made each minute by one or more of the code solenoids.

The provision of the disconnect solenoid 37 and its associated switch means 36 provides an effective low power consuming system for identifying the long hours of non-use. This important feature, of course, is coupled with the action of the double micro-switch 19 which merely requires the particular solenoids affected to be energized for a very short period during the minute that tape perforation takes place.

While the invention has been described with reference to certain embodiments, they are to be considered illustrative rather than limiting, and it is intended to cover all further embodiments that fall within the spirit and scope of the appended claims.

I claim:

1. In a surveillance system for a radiant energy communication receiver having an on-off switch and a station switch for recording by punching holes in a tape the identity and time duration of the one of a predetermined group of stations tuned by the station switch and for recording the disconnect condition of the receiver and the time period thereof, said disconnect condition arising when said station switch is tuned to stations not in the predetermined group or when said on-off switch is in off position, the combination of a recorder having a timing means for periodically closing in accordance with a predetermined constant time pattern a set-up switch for providing electrical power to set up the hole punching operation in accordance with a predetermined code and then closing an actuating switch for providing electrical power to punch the holes, set-up means responsive to the closing of said set-up switch and to the tuned station or to said disconnect condition to set up the recorder to punch a predetermined code in the tape, actuating means responsive to the closing of said actuating switch for punching the set-up predetermined code in the tape.

2. In a surveillance system as defined in claim 1 and wherein said timing means opens said set-up switch and said actuating switch in accordance with a predetermined time pattern, tape drive means responsive to the opening of said actuating switch for moving the tape a predetermined increment prior to the next closing of said set-up switch.

3. In a surveillance system as defined in claim 2 and including a slave unit with a multiple contact rotary switch for coupling to said station switch and wherein said set-up means includes code solenoids and a disconnect solenoid connected to said set-up switch and said multiple contact rotary switch for setting up the recorder to punch the predetermined code, and a switch means responsive to the off condition of the receiver on-off switch to bypass the multiple contact rotary switch and make only the disconnect solenoid responsive to said set-up switch, said switch means being responsive to the on condition of the receiver on-off switch to make the code solenoids and the disconnect solenoid responsive to said set-up switch.

4. In a surveillance system as defined in claim 3 and wherein said switch means includes a switch solenoid and a switch operated by said solenoid.

5. In a surveillance system as defined in claim 4 and wherein said set-up means includes a control lever operatively associated with each of said code solenoids and said disconnect solenoid, each control lever being spring biased to a retracted position and pivotally mounted to be moved to an advanced punch position by its respective code solenoid or disconnect solenoid when energized, an adjustable resilient spacer for each control lever for controlling its spatial relationship to its solenoid to provide faithful rapid response thereto, said actuating means having a power solenoid and a driving plate driven by said power solenoid and punch pins, said set-up means having bars slidably mounted on said driving plate between a retracted position and an advanced position in driving alignment with the punch pins, each control lever upon actuation by its solenoid sliding its respective bar into advanced position for actuation of its aligned punch pin to punch the tape.

6. In a system as defined in claim 5 and wherein an electrical insulator is positioned between said driving plate and said bars to facilitate sliding movement of the bars.

7. In a surveillance system as defined in claim 6 and wherein said tape drive means includes a spacing rosette, a bell crank lever having a roller at one end engaging said rosette and a spring connected to the other end, said spring and said bell crank lever being mounted at diametrically opposed sides of an adjustably pivoted member which enables adjustment of the spring tension on the bell crank lever.

8. In a surveillance system as defined in claim 1 and including time means independent of said set-up switch and set-up means for punching a hole in said tape each time said actuating switch is closed.

References Cited

UNITED STATES PATENTS

| | | | |
|---|---|---|---|
| 2,924,496 | 2/1960 | Rahmel | 346—37 |
| 3,051,775 | 8/1962 | Novak et al. | 346—37 |

FOREIGN PATENTS

| | | |
|---|---|---|
| 210,086 | 9/1957 | Australia. |

RICHARD B. WILKINSON, *Primary Examiner.*

M. L. LORCH, *Assistant Examiner.*